United States Patent
Mathew et al.

(10) Patent No.: US 9,369,537 B1
(45) Date of Patent: Jun. 14, 2016

(54) SYSTEMS AND METHODS FOR REGULATING DEVICE USAGE

(71) Applicant: Lock2Learn, LLC, Flemington, NJ (US)

(72) Inventors: Joel Kunjappy Mathew, Chicago, IL (US); Mohsin Nagaria, Karachi (PK); Ryan Weldon, Morristown, NJ (US)

(73) Assignee: Lock2Learn, LLC, Flemington, NJ (US)

( * ) Notice: Subject to any disclaimer, the term of this patent is extended or adjusted under 35 U.S.C. 154(b) by 0 days.

(21) Appl. No.: 14/711,667

(22) Filed: May 13, 2015

Related U.S. Application Data

(63) Continuation of application No. 14/675,437, filed on Mar. 31, 2015, now abandoned.

(51) Int. Cl.
| | |
|---|---|
| *G06F 3/048* | (2013.01) |
| *H04L 29/08* | (2006.01) |
| *G06F 3/0484* | (2013.01) |
| *G06F 3/0482* | (2013.01) |
| *H04L 29/06* | (2006.01) |
| *H04M 1/725* | (2006.01) |
| *H04N 21/475* | (2011.01) |
| *G11B 20/00* | (2006.01) |
| *H04L 12/58* | (2006.01) |

(Continued)

(52) U.S. Cl.
CPC .............. *H04L 67/22* (2013.01); *G06F 3/0482* (2013.01); *G06F 3/04842* (2013.01); *H04L 63/10* (2013.01); *H04M 1/72577* (2013.01); *G06F 21/629* (2013.01); *G06F 2221/2137* (2013.01); *G06F 2221/2149* (2013.01); *G06Q 20/35785* (2013.01); *G11B 20/00159* (2013.01); *H04L 12/583* (2013.01); *H04N 21/4751* (2013.01)

(58) Field of Classification Search
CPC ....... H04L 67/22; H04L 12/583; H04L 63/10; G06F 3/0482; G06F 3/04842; G06F 2221/2149; G06F 2221/2137; G06F 21/629; G06Q 20/35785; H04N 21/4755; G11B 20/00159; H04M 1/72577
USPC ........................................................ 715/741
See application file for complete search history.

(56) References Cited

U.S. PATENT DOCUMENTS

| | | |
|---|---|---|
| 5,142,358 A | 8/1992 | Jason |
| 5,654,746 A | 8/1997 | McMullan, Jr. et al. |

(Continued)

FOREIGN PATENT DOCUMENTS

| | | |
|---|---|---|
| CN | 102779051 | 11/2012 |
| CN | 103634481 | 3/2014 |

(Continued)

*Primary Examiner* — Patrick Riegler
(74) *Attorney, Agent, or Firm* — Wolf, Greenfield & Sacks, P.C.

(57) ABSTRACT

A device is provided, comprising at least one processor and at least one computer-readable storage medium having encoded thereon executable instructions that, when executed, cause the at least one processor to: monitor a user's usage of the device; in response to determining that an amount of time the user has been using the device has reached a selected limit for usage time, activate a home screen application to restrict the user's access to the device, wherein the home screen application is programmed to prompt the user to demonstrate at least one achievement; and in response to determining that the user successfully demonstrated at least one achievement, allow the user to regain access to the device.

30 Claims, 13 Drawing Sheets

(51) Int. Cl.
*G06Q 20/34* (2012.01)
*G06F 21/62* (2013.01)

(56) References Cited

U.S. PATENT DOCUMENTS

| | | | |
|---|---|---|---|
| 5,743,743 A | 4/1998 | Ho et al. | |
| 5,964,661 A | 10/1999 | Dodge | |
| 6,722,984 B1 | 4/2004 | Sweeney, Jr. et al. | |
| 8,626,095 B1 * | 1/2014 | Kim ................. | H04M 1/72563 455/127.4 |
| 8,719,898 B1 | 5/2014 | Barton et al. | |
| 8,726,365 B2 | 5/2014 | Lemke | |
| 8,769,063 B2 | 7/2014 | Barton et al. | |
| 8,799,994 B2 | 8/2014 | Barton et al. | |
| 8,806,570 B2 | 8/2014 | Barton et al. | |
| 8,863,168 B2 | 10/2014 | Craner | |
| 2002/0128061 A1 | 9/2002 | Blanco | |
| 2003/0061606 A1 | 3/2003 | Hartwig et al. | |
| 2003/0163811 A1 | 8/2003 | Luehrs | |
| 2004/0143839 A1 | 7/2004 | Gonzales-Caiazzo et al. | |
| 2005/0240959 A1 | 10/2005 | Kuhn et al. | |
| 2006/0287080 A1 | 12/2006 | Bychkov | |
| 2007/0013515 A1 | 1/2007 | Johnson et al. | |
| 2007/0094695 A1 | 4/2007 | Naka | |
| 2008/0148310 A1 | 6/2008 | Strickland | |
| 2008/0320558 A1 | 12/2008 | Imanishi et al. | |
| 2010/0048272 A1 | 2/2010 | Koh | |
| 2010/0100899 A1 | 4/2010 | Bradbury et al. | |
| 2010/0251281 A1 | 9/2010 | Craner | |
| 2010/0285871 A1 | 11/2010 | Shah et al. | |
| 2011/0065419 A1 * | 3/2011 | Book .................... | G06F 21/305 455/411 |
| 2012/0060123 A1 * | 3/2012 | Smith ........................... | 715/833 |
| 2012/0174021 A1 | 7/2012 | Dharawat | |
| 2012/0215328 A1 * | 8/2012 | Schmelzer ...................... | 700/91 |
| 2012/0278899 A1 | 11/2012 | Mahan | |
| 2012/0291101 A1 * | 11/2012 | Ahlstrom ............ | G06F 21/6218 726/4 |
| 2013/0059645 A1 | 3/2013 | Smock | |
| 2013/0082974 A1 * | 4/2013 | Kerr et al. ...................... | 345/174 |
| 2013/0145007 A1 * | 6/2013 | Randazzo ............. | H04W 48/04 709/223 |
| 2013/0185765 A1 | 7/2013 | Hew et al. | |
| 2013/0225151 A1 * | 8/2013 | King ................. | H04M 1/72577 455/419 |
| 2013/0254660 A1 * | 9/2013 | Fujioka ................... | A63F 13/12 715/707 |
| 2013/0295913 A1 * | 11/2013 | Matthews, III ... | H04M 1/72577 455/420 |
| 2013/0322665 A1 * | 12/2013 | Bennett et al. ................. | 381/300 |
| 2014/0073293 A1 * | 3/2014 | Kimura et al. ................. | 455/411 |
| 2014/0078079 A1 * | 3/2014 | Wang ..................... | H04M 1/67 345/173 |
| 2014/0108507 A1 | 4/2014 | Barker et al. | |
| 2014/0176469 A1 * | 6/2014 | Lim .............................. | 345/173 |
| 2014/0189825 A1 | 7/2014 | Lemke | |
| 2014/0255889 A1 | 9/2014 | Grimes et al. | |
| 2014/0272847 A1 | 9/2014 | Grimes et al. | |
| 2014/0272894 A1 | 9/2014 | Grimes et al. | |
| 2014/0278895 A1 | 9/2014 | Grimes et al. | |
| 2014/0344951 A1 * | 11/2014 | Brewer ................. | G06F 3/0488 726/28 |
| 2015/0007307 A1 * | 1/2015 | Grimes et al. ................... | 726/18 |
| 2015/0111559 A1 * | 4/2015 | Leaver et al. ................. | 455/418 |
| 2015/0156313 A1 * | 6/2015 | Zeng ................. | G06F 3/04817 455/411 |

FOREIGN PATENT DOCUMENTS

| | | |
|---|---|---|
| CN | 103713813 | 4/2014 |
| WO | WO 2008/082360 | 7/2008 |
| WO | WO 2013/181749 | 12/2013 |
| WO | WO 2014/047168 | 3/2014 |
| WO | WO 2014/164567 | 10/2014 |

\* cited by examiner

SYSTEMS AND METHODS FOR REGULATING DEVICE USAGE

RELATED APPLICATION

This Application is a continuation claiming the benefit under 35 U.S.C. §120 of U.S. application Ser. No. 14/675,437, entitled "SYSTEMS AND METHODS FOR REGULATING DEVICE USAGE," filed on Mar. 31, 2015, which is hereby incorporated by reference in its entirety.

BACKGROUND

Computing devices such as network-enabled mobile devices have become ubiquitous and have greatly improved people's ability to access information and communicate with each other, and have become powerful tools for learning and collaboration. However, computing devices can also be used in less productive ways. For instance, some users, in many cases children, spend an inordinate amount of time each day on social media, online games, etc. Such abuses may be detrimental to the users' physical, mental, and social health.

SUMMARY

In some embodiments, a device is provided, comprising at least one processor and at least one computer-readable storage medium having encoded thereon executable instructions that, when executed, cause the at least one processor to: monitor a user's usage of the device; in response to determining that an amount of time the user has been using the device has reached a selected limit for usage time, activate a home screen application to restrict the user's access to the device, wherein the home screen application is programmed to prompt the user to demonstrate at least one achievement; and in response to determining that the user successfully demonstrated at least one achievement, allow the user to regain access to the device.

In some embodiments, a method is provided, performed by at least one processor of a device, the at least one processor being programmed by executable instructions encoded on at least one computer-readable storage medium of the device, the method comprising: monitoring a user's usage of the device; in response to determining that an amount of time the user has been using the device has reached a selected limit for usage time, activating a home screen application to restrict the user's access to the device, wherein the home screen application is programmed to prompt the user to demonstrate at least one achievement; and in response to determining that the user successfully demonstrated at least one achievement, allowing the user to regain access to the device.

In some embodiments, at least one computer-readable storage medium is provided, having encoded thereon executable instructions that, when executed by at least one processor, cause the at least one processor to perform a method comprising: monitoring a user's usage of the device; in response to determining that an amount of time the user has been using the device has reached a selected limit for usage time, activating a home screen application to restrict the user's access to the device, wherein the home screen application is programmed to prompt the user to demonstrate at least one achievement; and in response to determining that the user successfully demonstrated at least one achievement, allowing the user to regain access to the device.

DETAILED DESCRIPTION

Figure 1B:
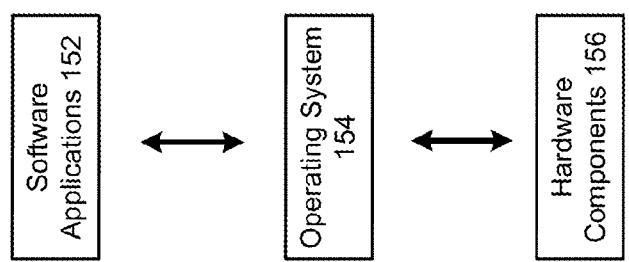
FIG. 1B shows interactions between some functional components of the illustrative device 100 shown in FIG. 1A, in accordance with some embodiments.

Parents and educators have long recognized that children of all ages are prone to spending too much time on electronic activities conducted on devices such as smartphones and tablets. Some parents simply forbid the use of such devices, but that approach is becoming increasingly impractical because of a growing social expectation among children, especially older children, that friends are to be in touch with each other all the time (e.g., via text messages, social media services, etc.). Furthermore, more and more schools have adopted educational technologies that require students to access materials and/or complete exercises online, so that the inability to access the Internet anytime, anywhere can become a handicap in academic learning.

The inventors have recognized and appreciated a need for techniques for regulating the usage of electronic devices such as smartphones and tablets. Accordingly, in some embodiments, techniques are provided for selectively allowing usage of an electronic device, for example, in a manner determined by an administrator such as a parent.

In some embodiments, software may be provided which, when executed, monitors an amount of time a user has been using an electronic device. Once the usage time reaches a certain limit, the software may operate to lock the electronic device. In some embodiments, the usage time limit may be set by an administrator (e.g., parent).

Once locked, the device may be unlocked in a number of different ways. For instance, the inventors have recognized and appreciated that the administrator (e.g., parent) may wish to impose one or more conditions on the continued usage of the device. Accordingly, in some embodiments, the user may be required to demonstrate one or more achievements in order to regain access to the device.

In some embodiments, the user may be prompted to answer one or more questions and may be allowed to continue using the device if at least some threshold number or fraction of the questions are answer correctly. The threshold number or fraction may be chosen by the administrator (e.g., parent). In some embodiments, the administrator may impose no limit on the number of questions the user may attempt to answer. In some embodiments, the administrator may require that all questions, or at least X out of Y questions be correctly answered, for any suitable X=1, 2, 3, 4, 5, . . . and Y=1, 2, 3, 4, 5, 6, . . . .

In some embodiments, the questions may be adapted to measure the user's academic achievement and/or aptitude. A question bank may be provided and the administrator may select one or more questions from the question bank to be answered by the user. The question bank may be organized in any suitable way, including, but not limited to, by grade level, study subject (e.g., mathematics, science, literature, English language, foreign language, history, etc.) and/or area of focus within a subject, level of difficulty (e.g., easy, medium, hard, etc.), question type (e.g., multiple choice, short answer, essay, etc.), and/or target skill (e.g., reading comprehension, logical reasoning, quantitative reasoning, analytical writing, persuasive writing, etc.).

In some embodiments, the administrator may specify one or more parameters for question selection, such as the user's grade level, one or more study subjects and/or areas of focus, level of difficulty, question type, and/or target skill. The one or more parameters may be used to select one or more questions to be answered by the user. For instance, in some embodiments, the one or more questions may be selected randomly from all questions matching the one or more parameters. In some embodiments, questions already answered by the user may be marked as such and may be removed from the pool of candidate questions for that user, either indefinitely or for some period of time (e.g., one week, two weeks, three weeks, one month, two months, three months, etc.). In some embodiments, only questions answered correctly by the user may be removed from the pool of candidate questions for that user.

Alternatively, or additionally, the administrator may browse through the question bank and select one or more questions, or one or more categories of questions from which one or more questions are to be drawn and presented to the user.

The inventors have recognized and appreciated that an electronic device may be sometimes be used without a network connection. For example, a user may use a device in a signal dead spot. Therefore, it may be desirable to maintain a question bank locally on the device, so that questions may be available even when the device is offline. For instance, in some embodiments, one or more questions may be retrieved from a remote source (e.g., a web service) and stored in a local database. Such a retrieval may take place in any suitable manner. For example, a retrieval may take place during a setup phase of a software application that manages device locking. Alternatively, or additionally, the software application may request questions from the remote source periodically (e.g., every day, two days, . . . , every week, two weeks, . . . , every month, two months, . . . , etc.). Furthermore, a user or administrator may at any time request updated questions. If a network connection is not available at the time of a scheduled or requested update, the software application may monitor the device's connection status and initiate a download of questions as soon as a connection becomes available.

In some embodiments, software may be provided to analyze answers submitted by the user. One or more inferences may be made, for example, that the user needs improvement in a certain subject, area of focus, target skill, etc. Such inferences may be used to bias the automatic selection of questions. For instance, for a user who appears to find mathematics challenging, more mathematics questions may be presented. Alternatively, or additionally, easier mathematics questions may be presented initially and the level of difficulty may be increased gradually (e.g., based on the progress made by the user).

It should be appreciated that aspects of the present disclosure are not limited to the presentation of questions by a software application that manages device locking. In some embodiments, a user may demonstrate achievement by completing one or more questions or other types of learning tasks via a separate software application. For example, the separate application may provide one or more electronic tokens to the user upon successful completion of one or more learning tasks and the users may submit the one or more tokens to unlock the device. Alternatively, or additionally, the application that manages device locking may interface with the application that administers learning tasks to verify that the user has completed the one or more learning tasks.

Furthermore, it should be appreciated that aspects of the present disclosure are not limited to the use of academic achievements as conditions for continued usage of a device. In some embodiments, a user may demonstrate one or more non-academic achievements to regain access to a device. For example, the user may submit evidence of completion of one or more activities such as music practice, sports practice, community service, household chore, etc. The evidence may be in any suitable form, including, but not limited to, photo, video, audio recording, electronic token, etc. A timestamp may be checked to ascertain that the evidence is credible. Furthermore, in some embodiments, the user may be able to continue using the device only if the one or more activities belong to one or more activity categories approved by an administrator (e.g., parent).

The inventors have recognized and appreciated that it may be desirable to allow an administrator to control not only whether a user may access a device, but also what the user may have access to on the device. For instance, a parent may wish to make educational games available to a young child, without making available violent games that are also installed on the device. Accordingly, in some embodiments, software may be provided to allow an administrator to specify and/or enforce one or more access policies. For example, an access policy may include a list of one or more third-party and/or native applications that a user is allowed to access, and/or a list of one or more third-party and/or native applications that a user is not allowed to access.

In some embodiments, an access policy may include one or more restrictions placed on an approved third-party or native application. As discussed above, the inventors have recognized and appreciated that electronic devices may be used not only for entertainment or social interaction purposes, but also for educational purposes, and therefore an administrator may wish to place different restrictions on different third-party and/or native applications. For instance, in some embodiments, an administrator may be able to specify a different usage time limit for each third-party or native application. For example, the administrator may specify a one-hour limit for an educational game and a 30-minute limit for a social media service, so that a user may play the educational game for an hour before being locked out of the device, but may use the social media service for only 30 minutes before being locked out.

Alternatively, or additionally, the administrator may be able to group third-party and/or native applications into multiple categories. In one example, the administrator may be able to create a category of one or more third-party and/or native applications (e.g., tools needed for homework assignments, tutoring, etc.) that a user may use indefinitely without being locked out. In another example, the administrator may be able to create a category of one or more third-party and/or native applications (e.g., educational games) that a user may use for a longer period of time (e.g., 60 minutes, 75 minutes, 90 minutes, 105 minutes, 120 minutes, etc.) and a different category of one or more third-party and/or native applications (e.g., games purely for entertainment) that a user may use for a shorter period of time (e.g., 2 minutes, 3 minutes, 5 minutes, 10 minutes, 15 minutes, 30 minutes, 45 minutes, 60 minutes, etc.) Within each category, the usage time for determining when to lock a device may be cumulative (e.g., a timer will continue to run if the user switches from one application to another application in the same category).

The inventors have recognized and appreciated that some electronic devices may be shared by multiple users (e.g., siblings living in the same household) and the users may have different needs. Accordingly, in some embodiments, software may be provided to allow an administrator to establish different profiles for different users. When a particular user logs on to a device, a profile corresponding to that user may be activated, and the device may be managed according to the activated profile. For example, an administrator may specify for each user a different usage time limit (e.g., a period of time after which the user is expected to demonstrate an achievement to continue using the device), different grade level, different set of one or more study subjects for which questions are to be presented, different list of one or more approved third-party and/or native applications, etc.

The inventors have further appreciated that, in an embodiment in which a user is required to answer one or more questions to unlock a device, it may be desirable to provide to an administrator information relating to the user's performance. Accordingly, in some embodiments, a report may be generated for a user and made available to an administrator. If multiple user profiles have been established, a separate report may be generated for each user, or an aggregate repot may be generated for multiple users selected by the administrator.

In some embodiments, a report may be generated periodically (e.g., every week, two weeks, three weeks, every month, two months, three months, etc.) or as requested by the administrator. Furthermore, the report may be based on answers provided by the user over some suitable period of time (e.g., the past week, two weeks, three weeks, month, two months, three months, etc.) and may show the user's progress over that period of time. The progress may be overall progress, or progress with respect to a certain study subject, area of focus, target skill, etc. The period of time covered by the report and/or the type of progress shown in the report may be specified by the administrator.

In some embodiments, a report may additionally, or alternatively, include information relating to a user's usage of a device. For instance, an administrator may request a report showing total usage over some suitable period of time (e.g., the past day, two days, . . . , week, two weeks, . . . , month, two months, . . . , etc.) and/or the usage over that period of time broken down by hour, day, week, month, etc. Additionally, or alternatively, an administrator may request a report on the usage over the same period of time, but broken down by third-party or native application, and/or by category of third-party and/or native applications.

It should be appreciated that the concepts introduced above and discussed in greater detail below may be implemented in any of numerous ways, as the disclosed concepts are not limited to any particular manner of implementation. The examples shown in the figures and described herein are provided solely for illustrative purposes.

The inventors have recognized and appreciated various technical challenges in implementing a software application that selectively allows usage of an electronic device. Some of these technical challenges are described below in connection with FIGS. 1A-B.

Figure 1A:
FIG. 1A shows an illustrative electronic device 100 on which one or more of the inventive concepts described herein may be implemented, in accordance with some embodiments.

FIG. 1A shows an illustrative electronic device 100 on which one or more of the inventive concepts described herein may be implemented, in accordance with some embodiments. In this example, the device 100 includes a number of buttons, such as a menu button 102, a home button 104, a back button 106, and a search button 108. The menu button 102 may be used to bring up a menu of one or more options that are available in a context from which the menu button 102 was activated. For example, the context may be a home screen of the device 100 or another application running in the foreground. The home button 104 may be used to return to a home screen from another context. The back button 106 may have different behaviors depending on the context of activation. For example, activating the back button 106 from an entry screen of an application may cause the device to exit the application and return to a home screen. The search button may also behave differently depending on the context of activation. For example, activating the search button 108 from an email folder may bring up a textbox in which one or more search terms may be entered to search for matching emails in the folder.

It should be appreciated that the device 100 is merely illustrative, and that the inventive concepts described herein may be implemented on different types of devices. For example, aspects of the present disclosure are not limited to the particular combination of buttons shown in FIG. 1A. Furthermore, any suitable types of buttons may be used, such as touch sensitive buttons (e.g., with capacitive or resistive sensing), push buttons, and/or software buttons.

FIG. 1B shows interactions between some functional components of the illustrative device 100 shown in FIG. 1A, in accordance with some embodiments. In this example, the device 100 has installed thereon an operating system 154, which may include one or more drivers programmed to interact with and/or control one or more hardware components 156 of the device 100. The one or more hardware components 156 may include, but are not limited to, one or more processors, memory devices, input/output devices (e.g., touchscreen, button, camera, microphone, speaker, etc.), and/or network interface hardware. The device 100 may also include one or more software applications 152, and the operating system 154 may provide an interface between the one or more software applications 152 and the one or more hardware components 156.

The inventors have recognized and appreciated that, for security reasons, some operating systems may be designed to prevent a software application from locking a device. For instance, a "rogue" application may be programmed to hijack a device by not presenting any user interface option for exiting. An operating system may be programmed to allow a user to exit a rogue application by pressing a reserved button (e.g., the home button 104 or back button 106 of the illustrative device 100 shown in FIG. 1A). To prevent the rogue application from disabling the reserved button, the application programming interface (API) exposed by the operating system may be such that there is no way for a third-party application to change the behavior of the reserved button.

The inventors have recognized and appreciated that a user of the illustrative device 100 may be able to circumvent a lock set up by an administrator by using a reserved button (e.g., the home button 104 or back button 106) to exit the software application that manages device locking, even though the locking is implemented for legitimate reasons. The inventors have further appreciated that a potential solution is to modify the operating system API to allow third-party applications to change the behavior of the reserved button, but that solution may make the device 100 more vulnerable to attacks by rogue applications. Accordingly, it may be desirable to implement locking without modifying the operating system API.

The inventors have recognized and appreciated that some operating systems (e.g., an Android™ operating system) may expose a different API to a home screen (e.g., a "launcher" for a device running an Android™ operating system) compared to other applications. In some embodiments, a home screen may be an application that, when a user logs on to a device, presents a screen displaying one or more third-party and/or native applications that are available on the device. For example, a home screen may include a grid or list view of the available applications, and the home screen may be responsible for starting an application selected by the user. An operating system may include a default home screen, and/or a custom home screen developed by a third party may be installed on a device.

The inventors have recognized and appreciated that home screens have conventionally been developed to create a look and feel of a device to suit a user's taste. By contrast, in some embodiments, a home screen is provided to allow an administrator to control how a user uses a device (e.g., by implementing device locking, displaying only approved applications, etc.).

Figure 2:
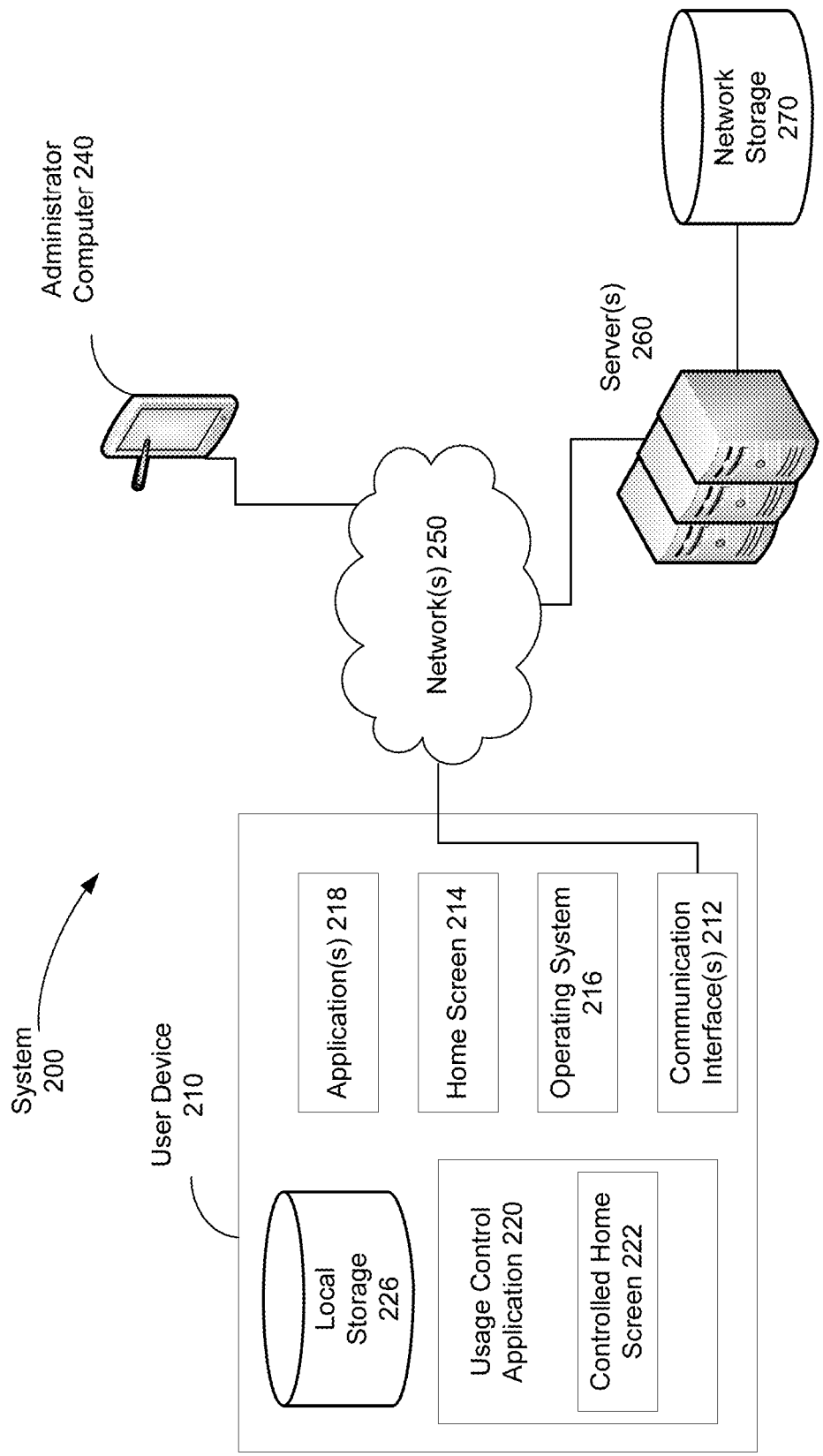
FIG. 2 shows an illustrative system 200 in which one or more of the inventive concepts described herein may be implemented, in accordance with some embodiments.

FIG. 2 shows an illustrative system 200 in which one or more of the inventive concepts described herein may be implemented, in accordance with some embodiments. The system 200 is merely illustrative, as the concepts disclosed herein are not limited to being implemented on the system 200 and can be implemented on any suitable computer system. The system 200 includes a user device 210, which may be a mobile phone, a tablet computer, a laptop computer, a desktop computer, or any other computing device. The system 200 may also include any number of additional electronic devices with which the device 210 may communicate. For instance, the system 200 includes a computer 240 (which may be used by an administrator such as a parent), one or more servers 260, and network storage 270, but these devices are merely illustrative.

In the example shown in FIG. 2, the device 210, the computer 240, and the one or more servers 260 may be configured to communicate with each other via one or more networks 250. For example, the device 210 may include one or more communication interfaces 212 configured to transmit and/or receive data via the one or more networks 150. Any suitable communication protocol or combination of communication protocols may be used by one or more communication interfaces 212, as aspects of the present disclosure are not limited to the use of any particular communication technology.

In some embodiments, the device 210 may be configured to receive input from and/or provide output to a user via one or more user interfaces (not shown). The one or more user interfaces may include a keyboard interface, a touchscreen interface, a speech interface, any combination thereof (e.g., a multimodal interface), and/or any other user interfaces. As one example, a touchscreen interface may be used to present various user interface elements such as buttons, menus, scrollbars, etc., and may be configured to recognize various touchscreen gestures. The touchscreen interface may also be used to emulate a keyboard interface. As another example, the one or more user interfaces may include a microphone for capturing user speech, and the captured speech may be processed by an automatic speech recognition engine (not shown) configured to convert input speech into text. As another example, the one or more user interfaces may include a speaker to play audio such as recorded or synthesized speech.

Furthermore, the one or more user interfaces may provide output to a user in one or more different modes, such as visual, audible, and/or tactile. As one example, the one or more user interfaces may be capable of displaying text and/or graphical images to the user. As another example, the one or more user interfaces may be capable of rendering an audible signal (e.g., synthesized and/or recorded speech) and/or a tactile signal. Any suitable combination of input and/or output modes may be used, as aspects of the present disclosure are not limited to any particular mode of interaction with the user.

In the example shown in FIG. 2, the device 210 includes an operating system 216 and one or more applications 218. The device 210 may further include a home screen 214 from which the one or more applications 218 may be started. For example, in some embodiments the operating system 216 may be an Android™ operating system, and the home screen 214 may be a launcher. However, it should be appreciated that aspects of the present disclosure are not limited to the use of an Android™ operating system.

In some embodiments, the device 210 may include a usage control application 220 for selectively allowing usage of the device 210. The usage control application 220 may use any one or more of the techniques described herein. For example, the usage control application 220 may include a controlled home screen 222, which may be enabled when an administrator activates a controlled mode and may be disabled when the controlled mode is deactivated. Once enabled, the controlled home screen 222 may require the user to answer one or more questions to gain access to the device 210. Alternatively, or additionally, the controlled home screen 222 may only allow the user to start applications that are approved by the administrator.

In some embodiments, one or more questions presented by the controlled home screen 222 to the user may be retrieved from a local storage 226 of the device 210. Alternatively, or additionally, one or more questions may be retrieved from the network storage 270, for example, by submitting a request to the one or more servers 260 via the one or more networks 250.

The local storage 226 and/or network storage 270 may be implemented in any suitable manner. For instances, in some embodiments, the local storage 226 may include an SQLite database configured to store questions and/or any other suitable data.

The inventors have recognized and appreciated that it may be desirable to incorporate images into some questions, but doing so may increase the size of the storage space needed to store the questions. Accordingly, in some embodiments, only textual content of the questions is stored in the local storage 226, and image content may be retrieved as needed from the network storage 270. The local storage 226 may store some questions that do not require image retrieval, so that questions may be presented even when there is no network connection. However, it should be appreciated aspects of the present disclosure are not limited to the storage of images in the network storage 270, as in some embodiments both textual content and image content may be stored in the local storage 226.

In some embodiments, the usage control application 220 may store one or more assessment results (e.g., number of questions answered correctly or incorrectly by the user) in the local storage 226, and/or transmit the one or more results to the one or more servers 260 for processing and/or storage in the network storage 270. Results that have been transmitted to the network storage 270 may be marked as such in the local storage 226, so that the results are not transmitted again. In some embodiments, the local storage 226 and the network storage 270 may be synchronized. If the device is offline when the user provides the results, a synchronization service may check for network connectivity and perform a synchronization operation when the network becomes available.

In some embodiments, the one or more servers 260 may use the one or more results received from the device 210 to generate a report on the performance of the user and may make the report available to the administrator. For example, the one or more servers 260 may provide a web portal through which the administrator may access the report. The administrator may access the web portal from any suitable device, such as the computer 240 and/or the device 210.

In some embodiments, communication with the web portal provided by the one or more servers 260 may be secured. For example, one or more cryptographic protocols, such as Transport Layer Security (TLS), Secure Sockets Layer (SSL), etc., may be used to provide one or more forms of security, such as secrecy, confidentiality, integrity, authentication, etc. In some embodiments, the web portal may provide the only way to access the network storage 270. For example, the network storage 270 may include a cloud database that is not public accessible. To communicate with the cloud database (e.g., to retrieve textual and/or image content for a question, to store an assessment result, to access a report, etc.), the usage control application 220 may establish a secured (e.g., encrypted) connection with the web portal. The inventors have recognized and appreciated that it may be desirable to protect user information by securing communication between the usage control application 220 and the web portal. However, it should be appreciated that aspects of the present disclosure are not limited to the use of any particular security protocol, or any security protocol at all.

In some embodiments, the device 210 may be shared by a plurality of users, and the administrator may wish to control usage for at least two of the users. The usage control application 220 may allow the administrator to establish separate profiles for such users. For example, information pertaining to a particular user (e.g., usage restrictions and/or assessment results) may be stored in association with the profile of that user. In this manner, the administrator may define different usage restrictions and/or request separate reports for the users.

In some embodiments, a user may interact with one or more devices (not shown) other than the device 210. For example, the user may use different devices at different locations (e.g., school, home, etc.), or the user may receive a replacement device when a device is lost. Each of the other devices may also have an instance of the usage control application 220 installed thereon, which may be linked to the same account (e.g., by logging in using the same credentials established during an account setup process).

The one or more servers 260 may be configured to aggregate results received from multiple devices for the same user (e.g., results associated with the same user profile). In this manner, a report generated for a user may take into account activities conducted by the user on multiple devices. However, it should be appreciated that aspects of the present disclosure are not limited to the generation of reports by the one or more servers 260, as reports may alternatively, or additionally, be generated by the device 210 using information stored in the local storage 226 and/or information retrieved from the network storage 270 via the one or more networks 250.

It should be appreciated that the various components of the system 200 shown in FIG. 2 and described above are merely illustrative. The inventive concepts disclosed herein may be implemented in any suitable manner using any suitable device or combination of devices, and do not require any particular component or arrangement of components. For instance, in some embodiments, device locking may be implemented without using a home screen.

FIGS. 3A-F show a series of illustrative screens 300A-F for configuring a usage control application (e.g., the illustrative usage control application 220 shown in FIG. 2), in accordance with some embodiments. For example, the screens 300A-F may be presented by the usage control application to an administrator to allow the administrator to establish a profile for a user.

Figure 3A:
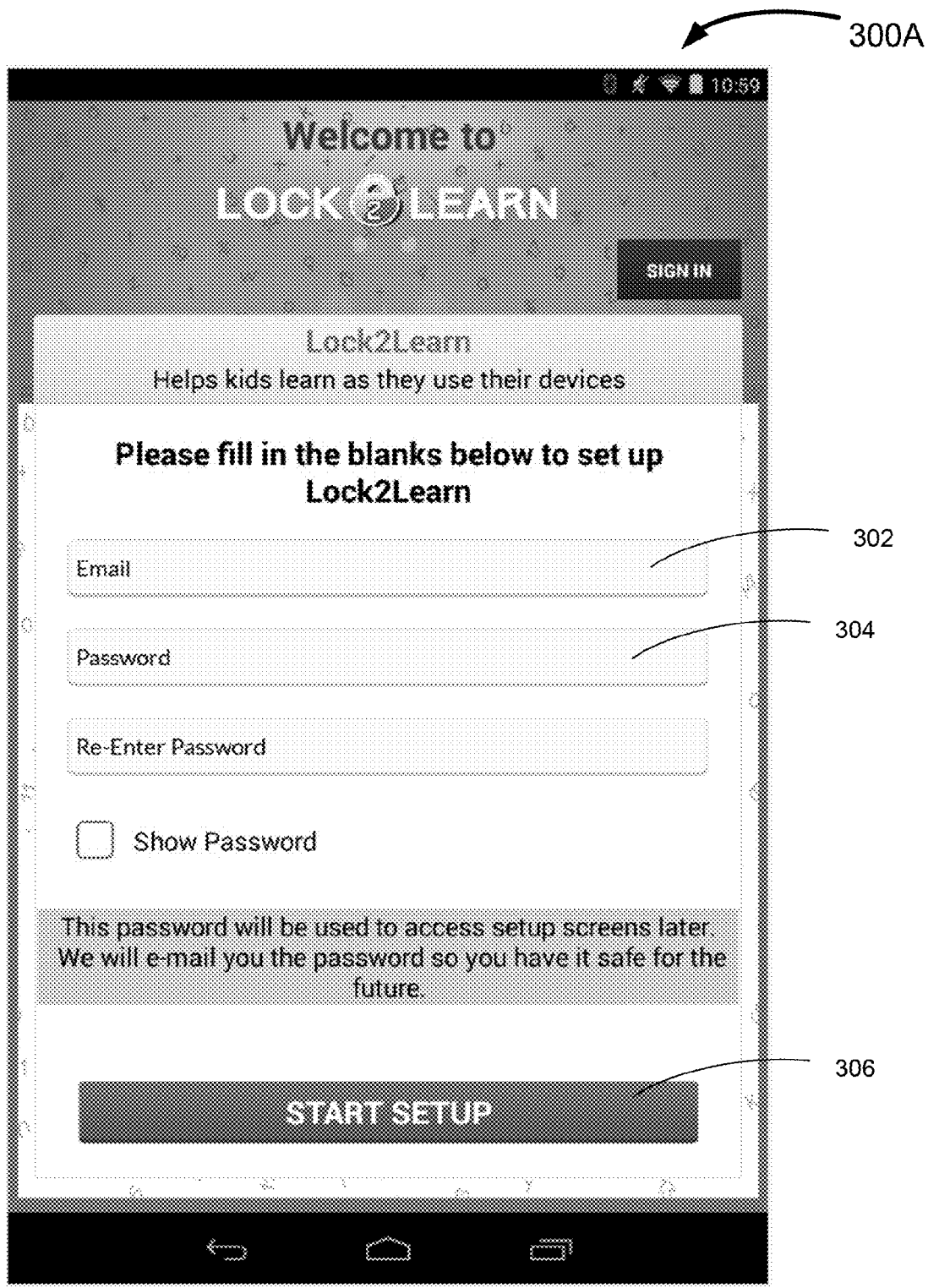
FIGS. 3A-F show a series of illustrative screens 300A-F for configuring a usage control application, in accordance with some embodiments.

In some embodiments, after installing and launching the usage control application, the administrator may be prompted by the usage control application to complete a setup process. FIG. 3A shows an illustrative entry screen 300A for a setup process, in accordance with some embodiments. The screen 300A may prompt the administrator to provide one or more pieces of information. For example, the screen 300A may include a text field 302 (or any other suitable combination of one or more user interface elements) for entering contact information. Examples of contact information include, but are not limited to, email address, phone number, and/or postal address. In some embodiments, one or more pieces of contact information (e.g., email or phone number) may also be used as an identifier for an account established for the administrator.

In some embodiments, the screen 300A may additionally include a text field 304 (or any other suitable combination of one or more user interface elements) for establishing one or more login credentials for the administrator. In the example shown in FIG. 3A, the one or more login credentials include a password. If the administrator forgets the password, a password recovery process may be initiated, for example, by prompting the administrator to provide authenticating information. Upon successful completion of the password recovery process, the password, or a new temporary password, may be provided to the administrator (e.g., sent to the email address entered into the text field 302).

It should be appreciated that one or more other types of credentials may be used in addition to, or instead of, a password. For example, in some embodiments, the administrator may provide some suitable biometric information such as voiceprint, fingerprint, iris scan, etc. It should also be appreciated that the screen 300A may prompt the administrator for any suitable combination of information items in addition to, or instead of, the illustrative information items discussed above. For example, in some embodiments, the administrator may be required to provide a minimum set of information items (e.g., email and password), but may have the option of providing additional information such as demographic information.

Figure 3B:
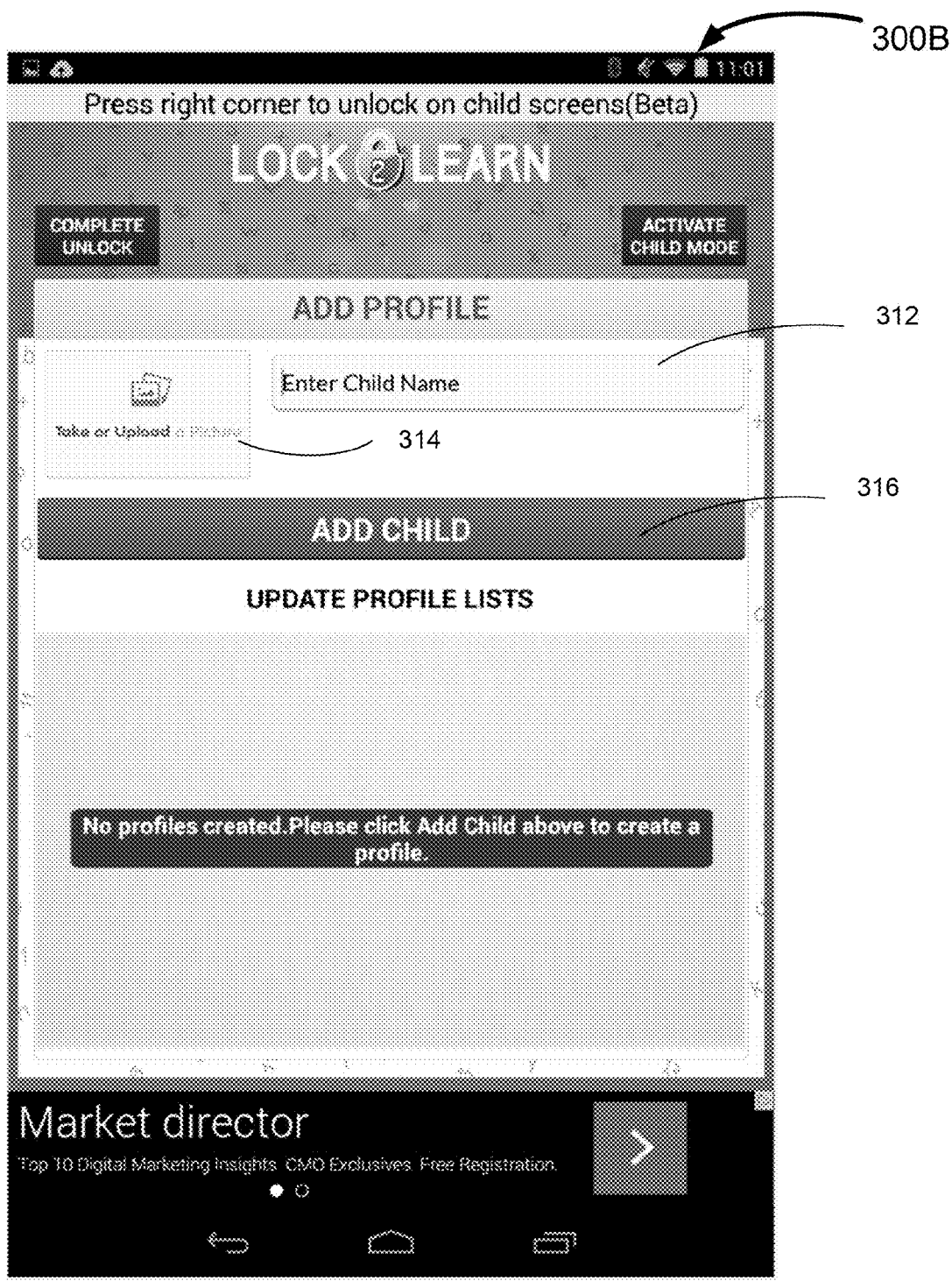

In the example shown in FIG. 3A, once the administrator has provided all of the required information items, the administrator may activate a button 306 to proceed to a next screen in the setup process, such as the illustrative screen 300B shown in FIG. 3B. The screen 300B may prompt the administrator to establish a profile for a user whose device usage is to be controlled. For example, the screen 300B may include a text field 312 (or any other suitable combination of one or more user interface elements) for entering the user's name. In some embodiments, the screen 300B may additionally include a button 314 for taking or uploading a photo of the user.

Figure 3C:
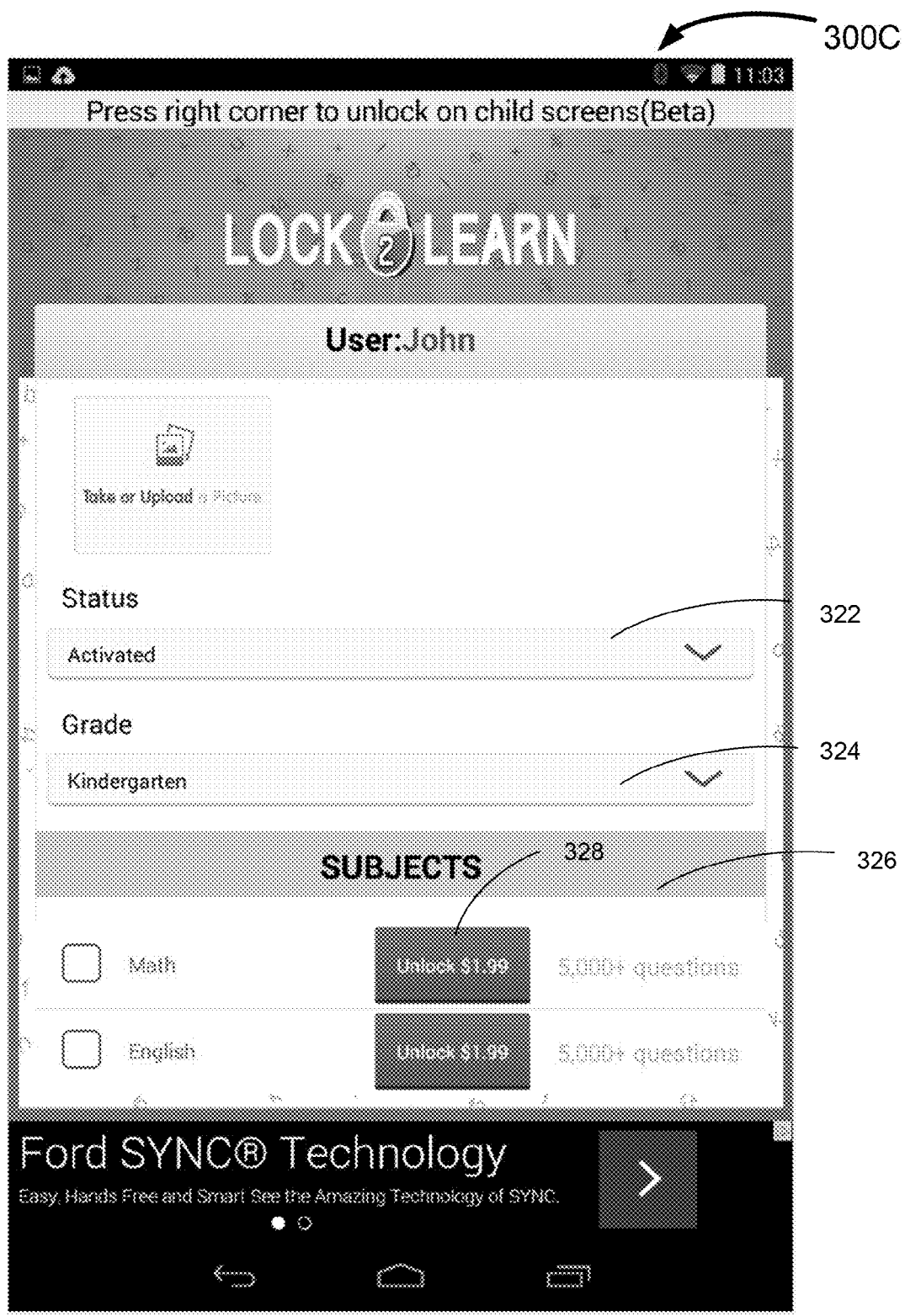

In the example shown in FIG. 3B, once the administrator has provided the user's name and/or photo, the administrator may activate a button 316 to proceed to a next screen in the setup process, such as the illustrative screen 300C shown in FIG. 3C. The screen 300C may prompt the administrator to provide information regarding the user for whom the profile is being established. As one example, the screen 300C may include a menu 322 (or any other suitable combination of one or more user interface elements) for indicating whether the profile is to be activated. As another example, the screen 300C may include a menu 324 (or any other suitable combination of one or more user interface elements) for indicating a grade level for the user (e.g., pre-school, kindergarten, first grade, second grade, third grade, fourth grade, fifth grade, sixth grade, seven grade, eighth grade, ninth grade, tenth grade, eleventh grade, or twelve grade). As another example, the screen 300C may include a list 326 of selectable study subjects. Examples of study subjects include, but are not limited to, mathematics, science, literature, English language, foreign language, and/or history. The administrator may also make available additional questions in each study subject, for example, by activating a button corresponding to a desired subject (e.g., a button 328 for additional questions in mathematics).

Alternatively, or additionally, the screen 300C may include a text field (or any other suitable combination of one or more user interface elements) for entering one or more search terms to be used in searching for matching question categories, such as grade level, study subject, area of focus within a subject, level of difficulty, question type, target skill, etc. The administrator may select any combination of one or more question categories from which questions are to be drawn (e.g., randomly or based on the user's progress).

Figure 3D:
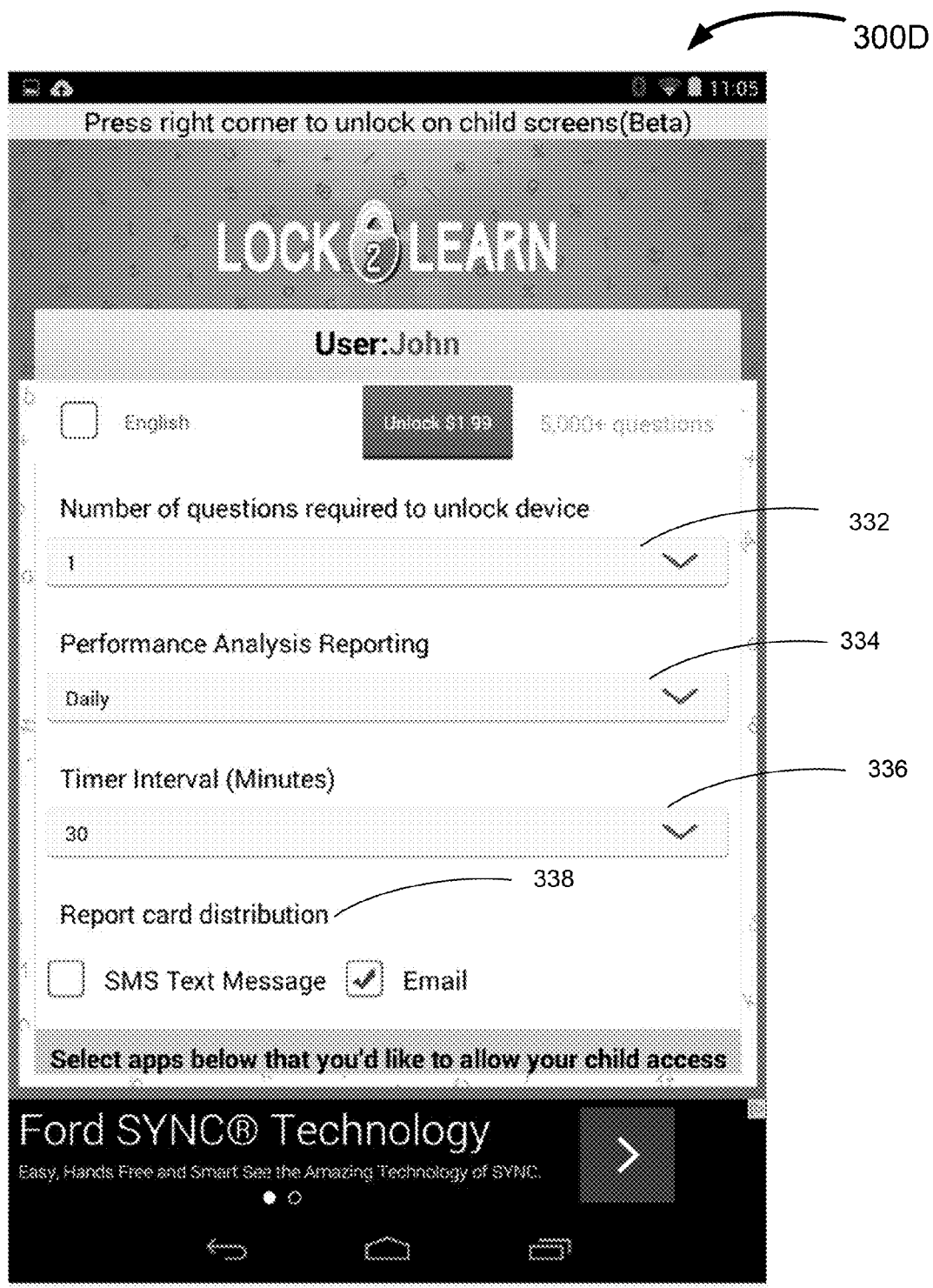

FIG. 3D shows an illustrative screen 300D, which may be a portion of the screen 300C shown in FIG. 3C that can be made visible by scrolling down. Alternatively, the screen 300D may be a separate screen. In some embodiments, the screen 300D may include a menu 332 (or any other suitable combination of one or more user interface elements) for indicating a number of questions that the user is expected to answer correctly to unlock the device. In some embodiments, the administrator may impose no limit on the number of questions the user may attempt to answer to reach the required threshold of correct answers (e.g., 1, 2, 3, 4, 5, 6 . . . ). In some embodiments, the administrator may require that all questions, or at least X out of Y questions be correctly answered, for any suitable X=1, 2, 3, 4, 5, . . . and Y=1, 2, 3, 4, 5, 6, . . . .

In some embodiments, the screen 300D may include a menu 336 (or any other suitable combination of one or more user interface elements) for indicating a usage time limit (e.g., 2 minutes, 3 minutes, 5 minutes, 10 minutes, . . . ).

In some embodiments, the screen 300D may prompt the administrator to indicate reporting presences. For example, the screen 300D may include a menu 334 (or any other suitable combination of one or more user interface elements) for indicating a reporting frequency (e.g., every week, two weeks, three weeks, every month, two months, three months, etc.). Additionally, the administrator may be prompted to select a delivery method from a list 338 of available delivery methods (e.g, email, text message, etc).

Figure 3E:
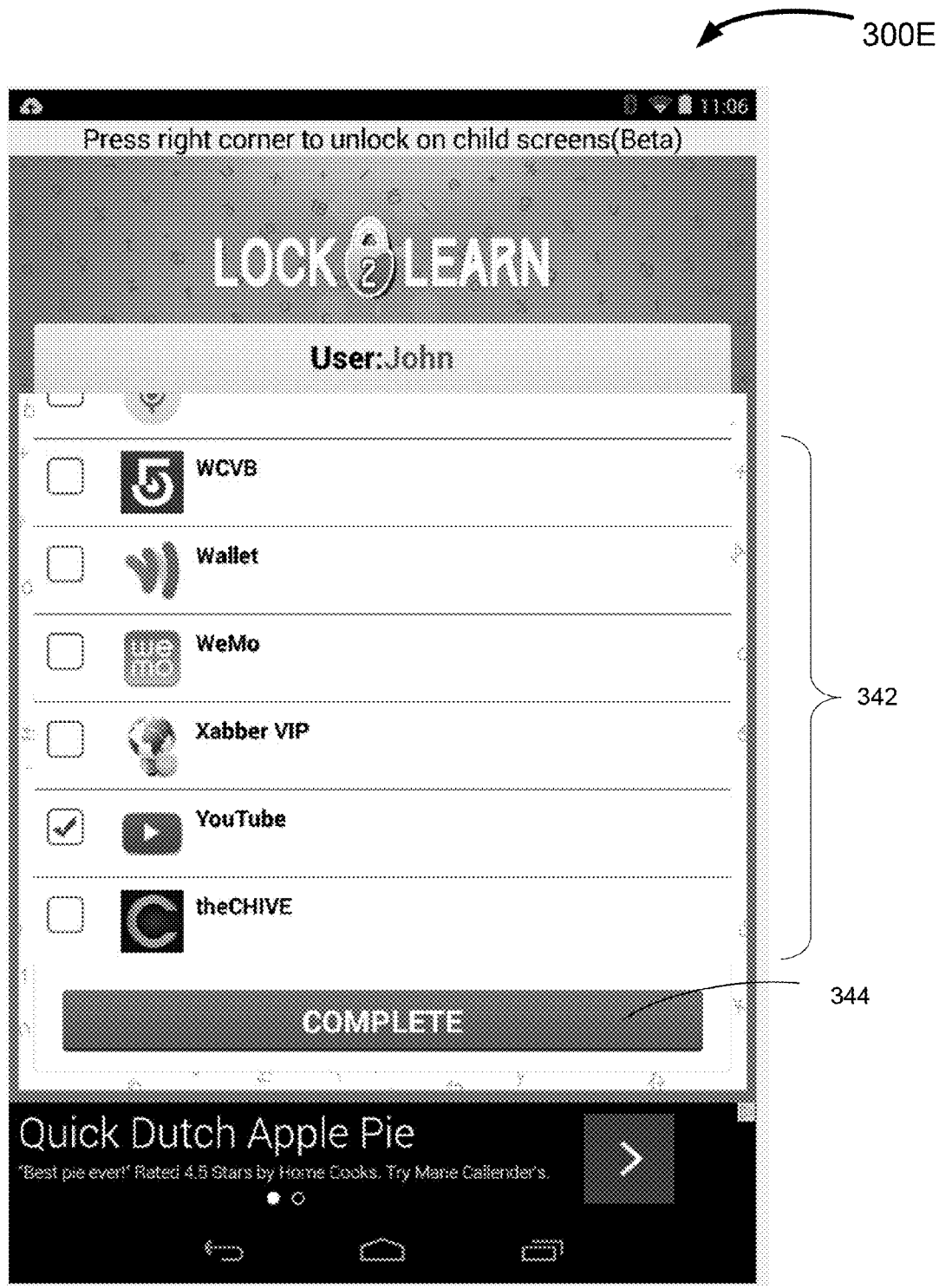

FIG. 3E shows an illustrative screen 300E, which may be a portion of the screen 300C shown in FIG. 3C that can be made visible by scrolling down. Alternatively, the screen 300E may be a separate screen. The screen 300E may include a list 342 of third-party and/or native applications that are available on the device on which the usage control application is executing. The administrator may be prompted to identify one or more of the applications as approved applications that the user is permitted to use.

Figure 3F:
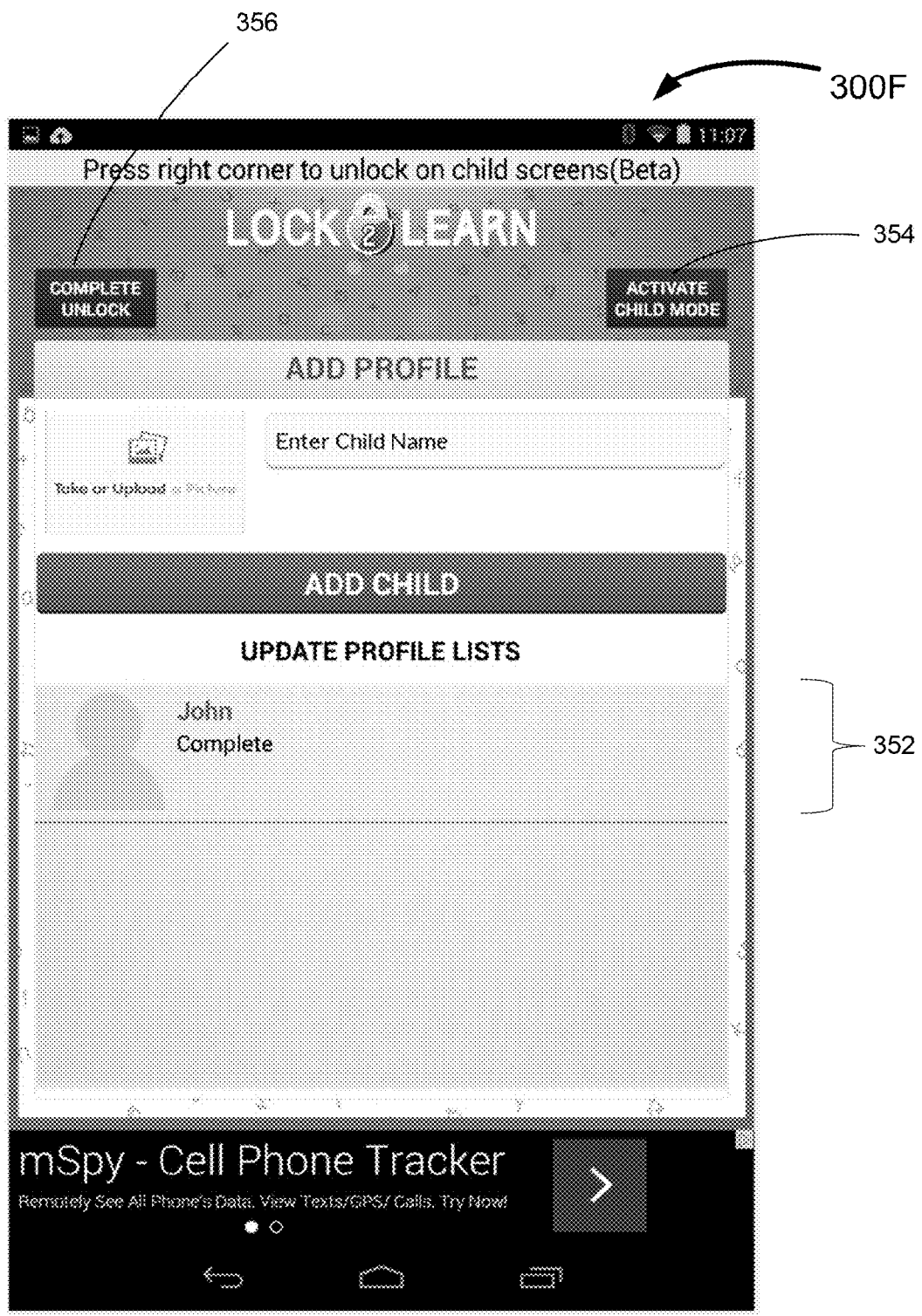

In some embodiments, the administrator may activate a button 344 on the screen 300E to complete the setup process, which may bring the administrator to the illustrative screen 300F shown in FIG. 3F. The screen 300F may be an updated version of the screen 300B, where the newly created profile is displayed in a list 352 of existing profiles. The administrator may choose to create another profile, update an existing profile, or activate a button 354 to turn on a controlled mode.

It should be appreciated that the setup process shown in FIGS. 3A-F and described above is merely illustrative, as a setup process may be implemented in other manners (e.g., with different steps, different ordering of steps, different arrangement of user interface elements, etc.). Furthermore, it should be appreciated that a setup process may be performed from a computer that is different from the device on which usage is to be controlled. For example, the administrator may complete a setup process from any computer (e.g., the illustrative computer 240 shown in FIG. 2) via a web portal or other interface (e.g., an interface provided by the illustrative one or more servers 260 shown in FIG. 2).

Figure 4A:
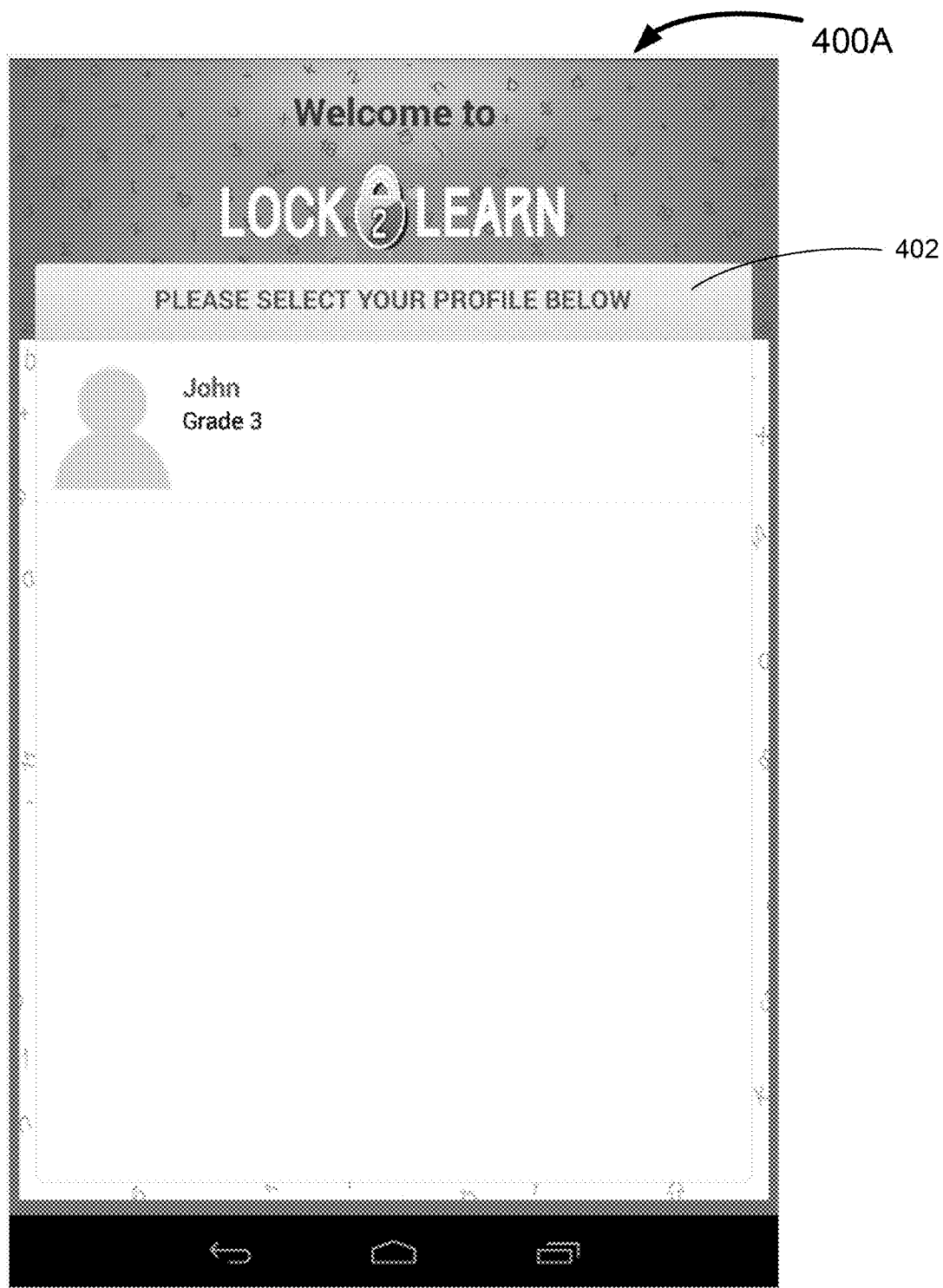
FIG. 4A shows an illustrative entry screen 400A for an unlocking process, in accordance with some embodiments.
Figure 4B:
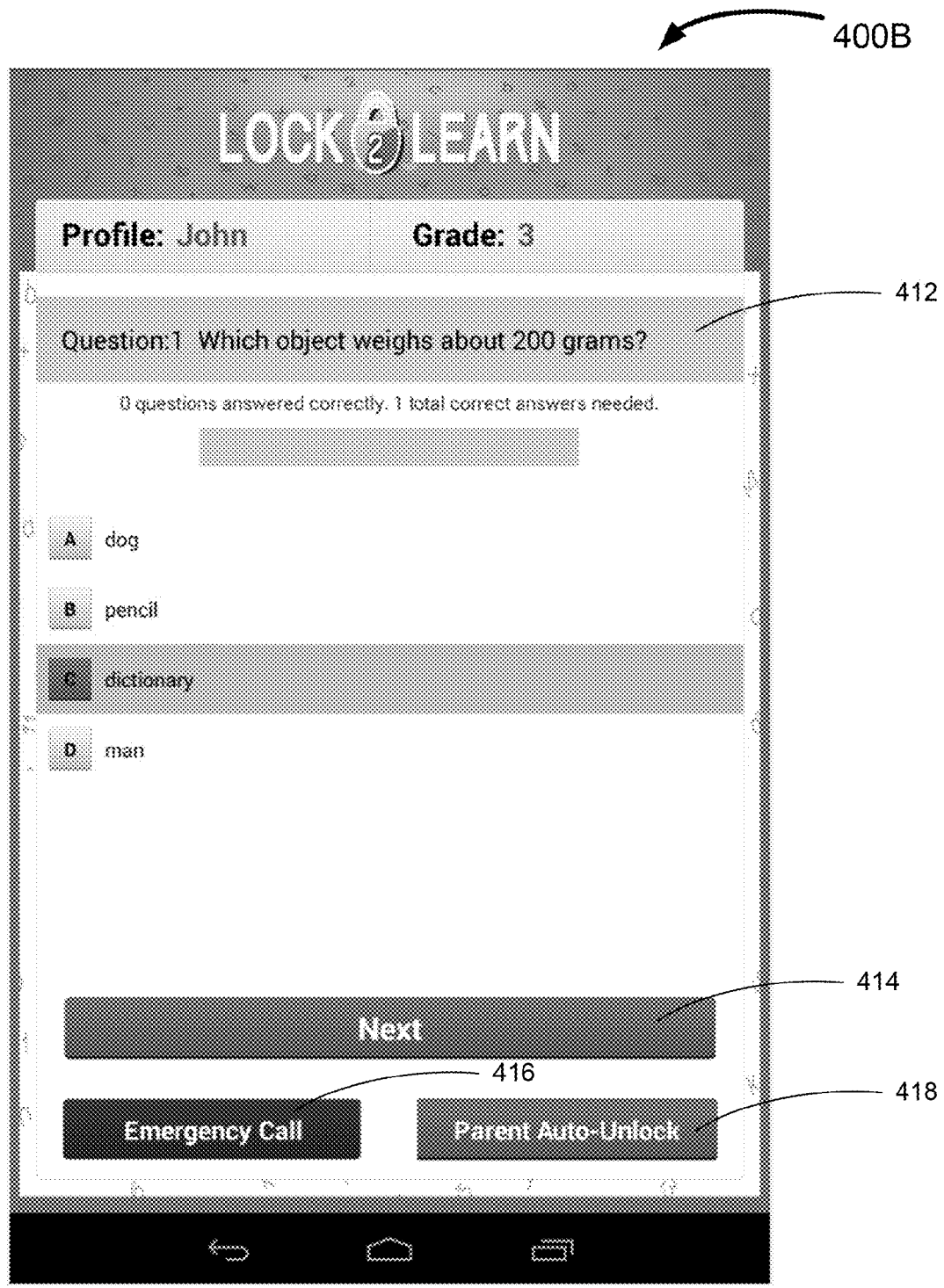
FIG. 4B shows an illustrative entry screen 400B for prompting a user to answer a question, in accordance with some embodiments.
Figure 4C:
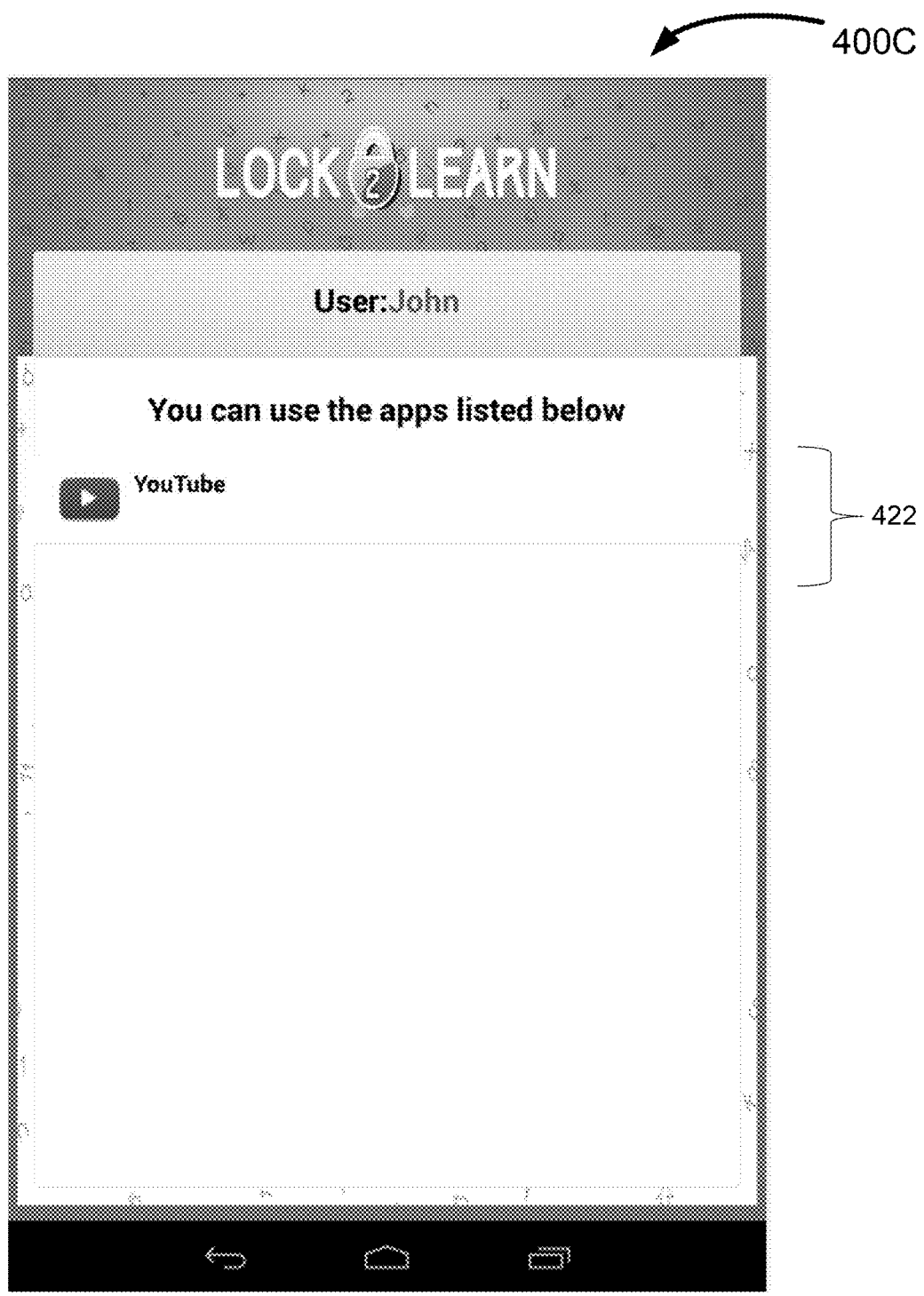
FIG. 4C shows an illustrative screen 400C, which may be presented to the user upon correctly answering a required number of questions, in accordance with some embodiments.

FIGS. 4A-C show a series of illustrative screens 400A-C for unlocking a device that has been locked by a usage control application (e.g., the illustrative usage control application 220 shown in FIG. 2), in accordance with some embodiments. For example, the screens 400A-C may be presented by the usage control application to a user when the user logs on to the device and/or when the user has used the device for a certain period of time. In some embodiments, the screens 400A-C may be presented by a home screen (e.g., the illustrative controlled home screen 222 shown in FIG. 2), so that the user may be unable to exit the screens 400A-C using a home or back button of the device. For example, the home screen may be implemented as a launcher for an Android™ operating system, and may be enabled when a controlled mode of the usage control application is activated and disabled when the controlled mode is deactivated.

FIG. 4A shows an illustrative entry screen 400A for an unlocking process, in accordance with some embodiments. For example, the screen 400A may be presented when the device is in a controlled mode and a user attempts to use the device.

In some embodiments, the screen 400A may prompt a user to select a profile from a list 402 of available profiles. After selecting a profile, the user may be presented with a next screen, such as the illustrative screen 400B shown in FIG. 4B. The screen 400B may present a question 412 and prompt the user to provide an answer. The question 412 may be selected based on the profile the user identified at the screen 400A. After answering the question 412, the user may activate the button 414 to have the answer evaluated. If the user provided a correct answer and the number of correct answers has reached a required threshold, then the user may proceed to a next screen, such as the illustrative screen 400C shown in FIG. 4C. Otherwise, the user may receive a next question on an updated version of the screen 400B.

In some embodiments, a user may be prompted to enter a password after selecting a profile. However, that is not required, as in some embodiments a user may proceed to demonstrate an achievement without having to enter a password. The inventors have recognized and appreciated that it may be difficult for some users (e.g., young children) to remember passwords and therefore it may be desirable not to require any password. The inventors have further recognized and appreciated that a user may be discouraged from selecting another user's profile because each user may be associated with a different set of approved applications. For example, a 10-year-old child may be discouraged from selecting a 5-year-old child's profile because the 5-year-old child may not be allowed to access applications of interest to the 10-year-old child.

In some embodiments, each question may have an associated period of time by which the user is expected to provide a response. For example, the questions may be practice questions for a standardized examination (e.g., a statewide assessment examination, a school admission examination, etc.), and the user may be given an amount of time that comparable to the amount of time that would be available during an administration of such an examination. In some embodiments, the administrator may be able to select how the questions are timed. For example, each question may be timed individually and/or a group of questions may be timed collectively.

In some embodiments, the screen 400B may provide one or more additional options. As one example, the screen 400B may include a button 416, which may be activated by the user to make an emergency communication (e.g., call, text, email, etc.) The emergency communication may be directed to one or more designated persons (who may or may not be administrators) and/or authorities (e.g., 911, police department, fire department, etc.). As another example, the screen 440B may include a button 418 and the administrator may override the lock by activating the button 418, which may trigger a prompt for one or more administrator credentials (e.g., a password established by the administrator during a setup process, such as the illustrative setup process shown in FIGS. 3A-F). If a matching credential is provided, the controlled mode may be disabled and the device may return to a non-controlled mode home screen (e.g., the illustrative home screen 214 shown in FIG. 2) from which all third-party and/or native applications may be available. Alternatively, the device may return to the screen 300F, where the administrator may add a new profile, update an existing profile, or activate a button 356 to return to a non-controlled mode home screen.

It should also be appreciated that, in some embodiments, a user may regain access to a device without answering a question. As one example, the user may be required to wait for a selected period of time before being able to regain access, in addition to, or instead of, demonstrating an achievement. The wait time may be specified by an administrator (e.g., parent). As another example, the administrator may specify one or more time intervals during which usage is not permitted (e.g., dinner time, weekday evenings past a certain time, etc.) and the user may be required to wait until the expiration of such a time interval. As yet another example, the administrator may specify a limit on the total amount of usage for each day and the user may be required wait until the next day once that limit has been reached.

FIG. 4C shows an illustrative screen 400C, which may be presented to the user upon correctly answering a required number of questions, in accordance with some embodiments. The screen 400C may display a list 422 of approved applications that the user may select and launch. The approved applications may be specified by the administrator (e.g., during the illustrative setup process shown in FIGS. 3A-F). Applications that have not been approved by the administrator may not be available for selection.

In some embodiments, a timer may be set when the user reaches the screen 400C and launches an application from the list 422 (e.g., by correctly answering a required number of the questions presented on the screen 400B). The timer may be set according to a usage time limit (e.g., 2 minutes, 3 minutes, 5 minutes, 10 minutes, 15 minutes, 30 minutes, 45 minutes, 60 minutes, etc.) stored in the profile the user identified at the screen 400A. When the timer runs out, the usage control application may operate to lock the device and present the screen 400B to the user again.

The inventors have recognized and appreciated that a user may experience a greater sense of freedom by not being required to demonstrate an achievement (e.g., not being required to answer questions) when logging on to a device initially. Accordingly, in some embodiments, a user may be required to answer one or more questions only after an appropriate usage time limit has been reached. In such an embodiment, when logging on to the device initially, the user may be able to bypass the screen 400B and proceed directly to the screen 400C after selecting a profile from the screen 400A.

In some embodiments, when the user closes an application selected and launched from the screen 400C, the user may be taken to the screen 400C. In this matter, the user is able to select and launch only the approved applications shown on the screen 400C. As discussed above, the screen 400C may be presented by a home screen (e.g., a launcher for an Android™ operating system), so that the user may be unable to exit the screen 400C using a home or back button of the device. Implementing the screen 400C as a home screen may also allow the usage control application to prevent the user from accessing system settings or performing system area operations. For example, an Android™ device may ordinarily allow a user to access one or more operating system settings via a notification area, which may be accessed by swiping from top to bottom on any screen showing a wheel icon on the top right. In some embodiments, in response to detecting such an attempt, or another type of attempt, to access an operating system setting, the usage control application may be activated to block the attempted access. In this manner, the user may be prevented from modifying device settings and/or from deleting an app such as the usage control application. In some embodiments, the usage control application may be brought to the foreground to inform the user that operating system access is not allowed. In some embodiments, a software service is provided that runs constantly on the device (e.g., in the background) and checks whether the device is in a controlled mode. If the device is a controlled mode, the software service may query a resource manager on the device to identify which applications are running and may selectively kill applications that are not approved according to the user's profile. Furthermore, if the user is somehow able to close the usage control application, the service may prevent the user from performing any action and may immediately restart the usage control application.

In some embodiments, the background service may be programmed to listen for an event indicative of one or more actions being taken by a user on a device. For example, the background service may listen for an onWindowsFocusChanged event, which may be fired when any action is taken, or when a new app is opened. In response to detecting an onWindowsFocusChanged event, the background service may check whether the device is in a controlled mode. If the device is in a controlled mode, the background service may check whether the user has demonstrated one or more achievements (e.g., by answering one or more questions correctly). If the user has not demonstrated the requisite one or more achievements, the background service may forcefully bring the usage control application to the foreground and take any app that the user tried to open to the background.

In some embodiments, usage may be tracked by obtaining a first timestamp when a user starts an application from the screen 400C and a second timestamp when the user closes the application and returns to the screen 400C. The two timestamps may then compared to determine a usage duration. Alternatively, or additionally, a resource manager may be queried to determine which applications are running at any given time. The usage data thus obtained may be used to generate a report to the administrator.

It should be appreciated that the unlocking process shown in FIGS. 4A-C and described above is merely illustrative, as an unlocking process may be implemented in other manners (e.g., with different steps, different ordering of steps, different arrangement of user interface elements, etc.).

Figure 5:
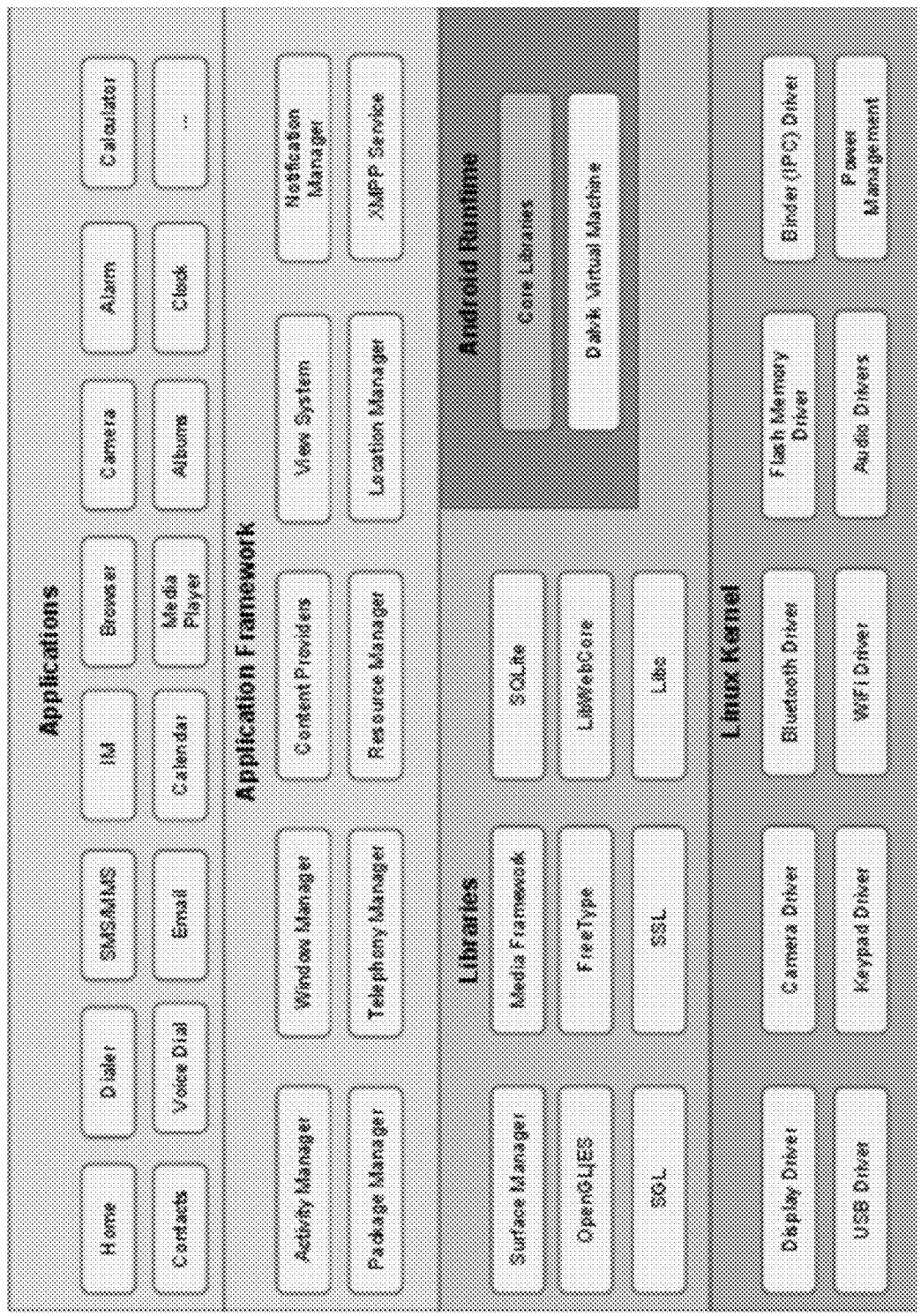
FIG. 5 shows an illustrative software stack for an Android™ operating system that may be used in connection with one or more of the inventive concepts described herein, in accordance with some embodiments.

FIG. 5 shows an illustrative software stack for an Android™ operating system that may be used in connection with one or more of the inventive concepts described herein, in accordance with some embodiments. In this example, the software stack includes four layers: applications, application framework, libraries and Android™ runtime, and Linux® kernel. In some embodiments, a usage control application may reside in the applications layer, along with other third-party and/or native applications. Applications in the applications layer may interact with the lower layers (e.g., libraries and Android™ runtime, or Linux® kernel) only through the application framework layer.

Figure 6:
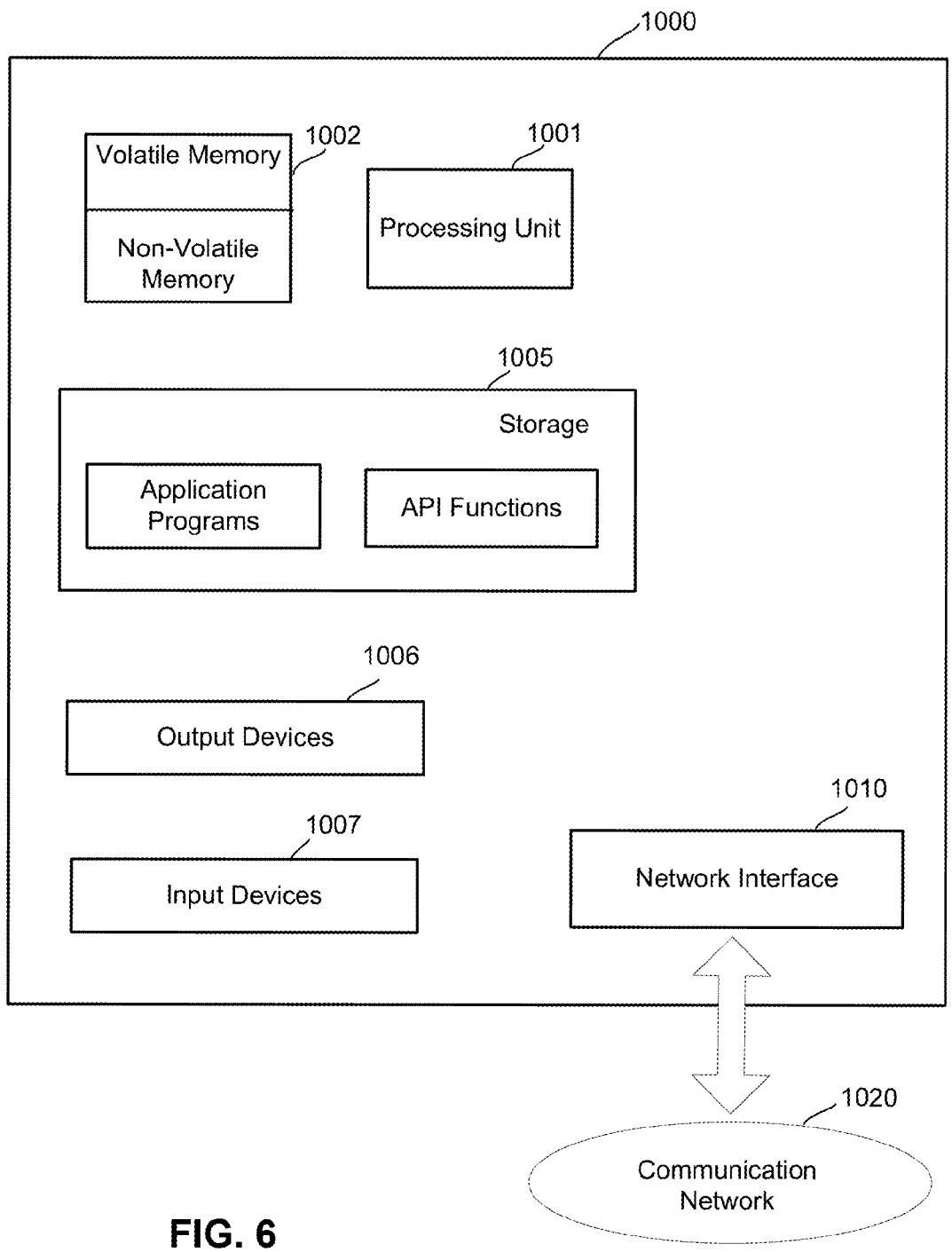
FIG. 6 shows, schematically, an illustrative computer 1000 on which any aspect of the present disclosure may be implemented.

FIG. 6 shows, schematically, an illustrative computer 1000 on which any aspect of the present disclosure may be implemented. For example, the computer 1000 may be a mobile device on which any of the features described in connection with the illustrative user device 210 shown in FIG. 2 may be implemented. The computer 1000 may also be used in implementing a server (e.g., the one or more illustrative servers 270 shown in FIG. 2) or some other component of a system in which any of the concepts described herein may be implemented.

As used herein, a "mobile device" may be any computing device that is sufficiently small so that it may be carried by a user (e.g., held in a hand of the user). Examples of mobile devices include, but are not limited to, mobile phones, pagers, portable media players, e-book readers, handheld game consoles, personal digital assistants (PDAs) and tablet computers. In some instances, the weight of a mobile device may be at most one pound, one and a half pounds, or two pounds, and/or the largest dimension of a mobile device may be at most six inches, nine inches, or one foot. Additionally, a mobile device may include features that enable the user to use the device at diverse locations. For example, a mobile device may include a power storage (e.g., battery) so that it may be used for some duration without being plugged into a power outlet. As another example, a mobile device may include a wireless network interface configured to provide a network connection without being physically connected to a network connection point.

In the embodiment shown in FIG. 6, the computer 1000 includes a processing unit 1001 having one or more processors and a non-transitory computer-readable storage medium 1002 that may include, for example, volatile and/or non-volatile memory. The memory 1002 may store one or more instructions to program the processing unit 1001 to perform any of the functions described herein. The computer 1000 may also include other types of non-transitory computer-readable medium, such as storage 1005 (e.g., one or more disk drives) in addition to the system memory 1002. The storage 1005 may also store one or more application programs and/or resources used by application programs (e.g., software libraries), which may be loaded into the memory 1002.

The computer 1000 may have one or more input devices and/or output devices, such as devices 1006 and 1007 illustrated in FIG. 6. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards and pointing devices, such as mice, touch pads, and digitizing tablets. As another example, the input devices 1007 may include a microphone for capturing audio signals, and the output devices 1006 may include a display screen for visually rendering, and/or a speaker for audibly rendering, recognized text.

As shown in FIG. 6, the computer 1000 may also comprise one or more network interfaces (e.g., the network interface 1010) to enable communication via various networks (e.g., the network 1020). Examples of networks include a local area network or a wide area network, such as an enterprise network or the Internet. Such networks may be based on any suitable technology and may operate according to any suitable protocol and may include wireless networks, wired networks or fiber optic networks.

Having thus described several aspects of at least one embodiment, it is to be appreciated that various alterations, modifications, and improvements will readily occur to those skilled in the art. Such alterations, modifications, and improvements are intended to be within the spirit and scope of the present disclosure. Accordingly, the foregoing description and drawings are by way of example only.

The above-described embodiments of the present disclosure can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the concepts disclosed herein may be embodied as a non-transitory computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, or other non-transitory, tangible computer storage medium) encoded with one or more programs that, when executed on one or more computers or other processors, perform methods that implement the various embodiments of the present disclosure discussed above. The computer readable medium or media can be transportable, such that the program or programs stored thereon can be loaded onto one or more different computers or other processors to implement various aspects of the present disclosure as discussed above.

The terms "program" or "software" are used herein in a generic sense to refer to any type of computer code or set of computer-executable instructions that can be employed to program a computer or other processor to implement various aspects of the present disclosure as discussed above. Additionally, it should be appreciated that according to one aspect of this embodiment, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various features and aspects of the present disclosure may be used alone, in any combination of two or more, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the concepts disclosed herein may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

What is claimed is:

1. A device comprising:
   at least one processor; and
   at least one computer-readable storage medium having encoded thereon executable instructions that, when executed, cause the at least one processor to implement a usage control application, wherein the usage control application is programmed to:
   monitor a user's usage of the device;
   in response to determining that an amount of time the user has been using the device while the device is in a controlled mode has reached a selected limit for usage time, activate a home screen to restrict the user's access to the device, wherein the home screen is not part of an operating system of the device, and wherein the home screen is programmed to:
      present a user interface to the user for demonstrating at least one achievement; and
      disregard selected user input until the user demonstrates at least one achievement, wherein the selected user input comprises a home button input or a back button input;
   determine whether the user successfully demonstrated at least one achievement;
   in response to determining that the user successfully demonstrated at least one achievement, allow the user to regain access to the device in the controlled mode; and
   in response to the user pressing a home button while the device is the controlled mode, activate the home screen to present a list of approved applications to the user, wherein the device has installed thereon at least one application that is not on the list of approved applications and is not presented to the user by the home screen.

2. The device of claim 1, wherein the at least one application that is not on the list of approved applications is a first application, and wherein the usage control application is programmed to:
   cause a second application that was running in a foreground of the device to be suspended when the home screen was activated.

3. The device of claim 2, wherein the usage control application is programmed to:
   in response to determining that the user successfully demonstrated at least one achievement, cause the second application to be restored to the foreground of the device.

4. The device of claim 1, wherein the at least one application that is not on the list of approved applications is a first application, and wherein the usage control application is programmed to:
   in response to the user pressing a back button from an entry screen of a second application while the device is in the controlled mode, activate the home screen to present the list of approved applications to the user, wherein the first application is not presented to the user by the home screen.

5. The device of claim 1, wherein the home screen is programmed to:
   prevent the user from accessing at least one selected system setting.

6. The device of claim 1, wherein the home screen is programmed to prevent the user from deleting the usage control application.

7. The device of claim 1, wherein the home screen is programmed to:
   identify the list of approved applications from a user profile associated with the user.

8. The device of claim 1, wherein the usage control application is programmed to:
   establish the list of approved applications based on input received from an administrator.

9. The device of claim 1, wherein the usage control application is programmed to:
   establish the selected limit for usage time based on input received from an administrator.

10. The device of claim 1, wherein the user interface for demonstrating at least one achievement comprises:
    a display of one or more questions to be answered by the user; and one or more user interface elements for answering the one or more questions.

11. A method performed by at least one processor of a device, the at least one processor being programmed by executable instructions encoded on at least one computer-readable storage medium of the device, the method comprising:
monitoring a user's usage of the device;
in response to determining that an amount of time the user has been using the device while the device is in a controlled mode has reached a selected limit for usage time, activating a home screen to restrict the user's access to the device, wherein the home screen is not part of an operating system of the device;
presenting, by the home screen, a user interface to the user for demonstrating at least one achievement;
disregarding, by the home screen, selected user input until the user demonstrates at least one achievement, wherein the selected user input comprises a home button input or a back button input;
determining whether the user successfully demonstrated at least one achievement;
in response to determining that the user successfully demonstrated at least one achievement, allowing the user to regain access to the device in the controlled mode; and
in response to the user pressing a home button while the device is the controlled mode, activating the home screen to present a list of approved applications to the user, wherein the device has installed thereon at least one application that is not on the list of approved applications and is not presented to the user by the home screen.

12. The method of claim 11, wherein the at least one application that is not on the list of approved applications is a first application, and wherein the method further comprises:
causing a second application that was running in a foreground of the device to be suspended when the home screen was activated.

13. The method of claim 12, further comprising:
in response to determining that the user successfully demonstrated at least one achievement, causing the second application to be restored to the foreground of the device.

14. The method of claim 11, wherein the at least one application that is not on the list of approved applications is a first application, and wherein the method further comprises:
in response to the user pressing a back button from an entry screen of a second application while the device is in the controlled mode, activating the home screen to present the list of approved applications to the user, wherein the first application is not presented to the user by the home screen.

15. The method of claim 11, further comprising:
preventing, by the home screen, the user from accessing at least one selected system setting.

16. The method of claim 11, wherein the executable instructions comprise instructions of a usage control application, and wherein the method further comprises:
preventing, by the home screen, the user from deleting the usage control application.

17. The method of claim 11, further comprising:
identifying the list of approved applications from a user profile associated with the user.

18. The method of claim 11, further comprising:
establishing the list of approved applications based on input received from an administrator.

19. The method of claim 11, further comprising:
establishing the selected limit for usage time based on input received from an administrator.

20. The method of claim 11, wherein the user interface for demonstrating at least one achievement comprises:
a display of one or more questions to be answered by the user; and
one or more user interface elements for answering the one or more questions.

21. At least one non-transitory computer-readable storage medium having encoded thereon executable instructions that, when executed by at least one processor, cause the at least one processor to perform a method comprising:
monitoring a user's usage of the device;
in response to determining that an amount of time the user has been using the device while the device is in a controlled mode has reached a selected limit for usage time, activating a home screen to restrict the user's access to the device, wherein the home screen is not part of an operating system of the device;
presenting, by the home screen, a user interface to the user for demonstrating at least one achievement;
disregarding, by the home screen, selected user input until the user demonstrates at least one achievement, wherein the selected user input comprises a home button input or a back button input;
determining whether the user successfully demonstrated at least one achievement;
in response to determining that the user successfully demonstrated at least one achievement, allowing the user to regain access to the device in the controlled mode; and
in response to the user pressing a home button while the device is the controlled mode, activating the home screen to present a list of approved applications to the user, wherein the device has installed thereon at least one application that is not on the list of approved applications and is not presented to the user by the home screen.

22. The at least one non-transitory computer-readable storage medium of claim 21, wherein the at least one application that is not on the list of approved applications is a first application, and wherein the method further comprises:
causing a second application that was running in a foreground of the device to be suspended when the home screen was activated.

23. The at least one non-transitory computer-readable storage medium of claim 22, wherein the method further comprises:
in response to determining that the user successfully demonstrated at least one achievement, causing the second application to be restored to the foreground of the device.

24. The at least one non-transitory computer-readable storage medium of claim 21, wherein the at least one application that is not on the list of approved applications is a first application, and wherein the method further comprises:
in response to the user pressing a back button from an entry screen of a second application while the device is in the controlled mode, activating the home screen to present the list of approved applications to the user, wherein the first application is not presented to the user by the home screen.

25. The at least one non-transitory computer-readable storage medium of claim 21, wherein the method further comprises:
preventing, by the home screen, the user from accessing at least one selected system setting.

26. The at least one non-transitory computer-readable storage medium of claim 21, wherein the executable instructions comprise instructions of a usage control application, and wherein the method further comprises:
   preventing, by the home screen, the user from deleting the usage control application.

27. The at least one non-transitory computer-readable storage medium of claim 21, wherein the method further comprises:
   identifying the list of approved applications from a user profile associated with the user.

28. The at least one non-transitory computer-readable storage medium of claim 27, wherein the method further comprises:
   establishing the list of approved applications based on input received from an administrator.

29. The at least one non-transitory computer-readable storage medium of claim 21, wherein the method further comprises:
   establishing the selected limit for usage time based on input received from an administrator.

30. The at least one non-transitory computer-readable storage medium of claim 21, wherein the user interface for demonstrating at least one achievement comprises:
   a display of one or more questions to be answered by the user; and
   one or more user interface elements for answering the one or more questions.

* * * * *